June 21, 1955 E. A. STEPHENS 2,711,274
SPARE WHEEL CARRIER CONSTRUCTION
Filed June 8, 1954
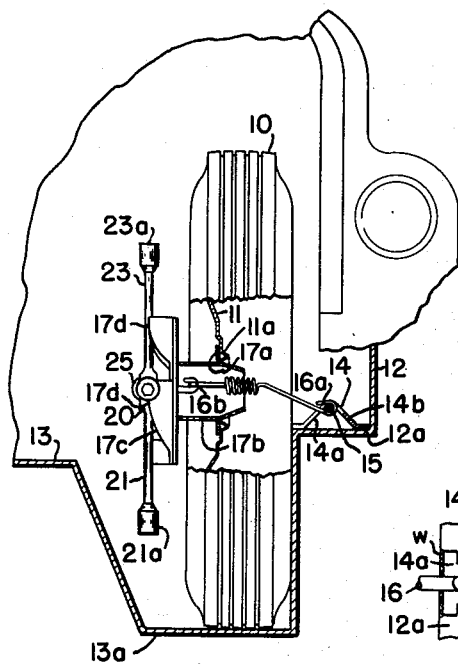
Fig. 1
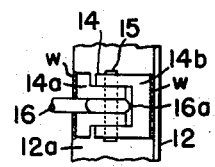
Fig. 1A
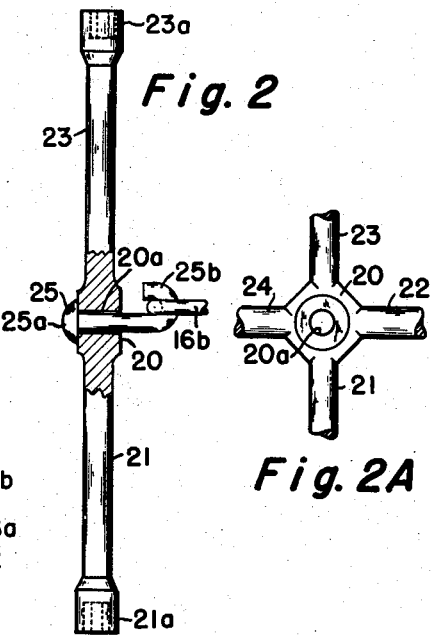
Fig. 2
Fig. 2A
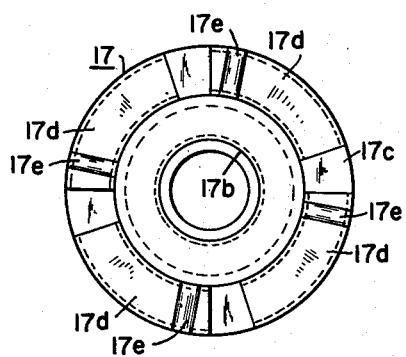
Fig. 3A
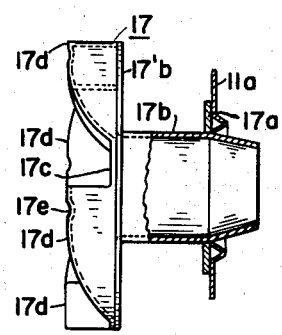
Fig. 3
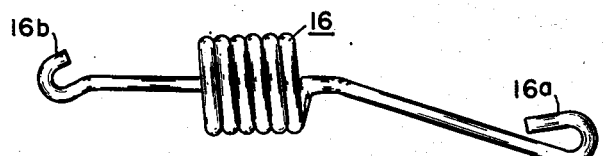
Fig. 4
INVENTOR.
Edward A. Stephens
BY
HIS ATTORNEYS

United States Patent Office 2,711,274
Patented June 21, 1955

2,711,274

SPARE WHEEL CARRIER CONSTRUCTION

Edward A. Stephens, Pittsburgh, Pa.

Application June 8, 1954, Serial No. 435,318

5 Claims. (Cl. 224—42.24)

This invention relates to carriers for spare tires for use on vehicles and more particularly to a device for removably securing a spare tire and wheel assembly in position on the vehicle.

Previous to my present invention, it has been customary to provide one means for securing a spare tire and wheel assembly in position, for example, in the luggage compartment of an automobile, then to employ a suitable tool or tools for jacking up the vehicle, for removing the punctured assembly from the hub of the vehicle, and for mounting the spare assembly in position in place of the punctured assembly. It frequently occurs that the tool or tools used for jacking up the car and for removing the hub cap and bolts cannot be conveniently located, or become lost or hidden in the maze of articles frequently carried in the luggage compartment. It has also been a rather tedious job to mount and remove a spare tire and wheel assembly on a vehicle. In this connection, it will be appreciated that the punctured assembly has to be placed in position on the spare mounting after the spare assembly has been secured on the hub. There have been a number of ways of mounting the spare assembly on the vehicle, including the use of bolts or bolts and nuts which co-operate with holes in the mounting flange of the assembly in a manner similar to the hub mounting. Wing nuts may also be used in place of wrench nuts to expedite the mounting and dismounting.

I have found that there has been a need for a simplified method of mounting a spare tire and wheel assembly in position and one that will make a tire mounting and jack tool conveniently and positively available for immediate use as needed.

Accordingly, it has been an object of my invention to provide an improved device for securing spare tire and wheel assemblies in position on a vehicle which permits quick and easy mounting and removal of the assembly.

Another object of this invention is to provide an improved device for securing spare tire and wheel assemblies in position on a vehicle which utilizes the tire tool itself.

A further object of this invention is to provide a tire tool construction which may be utilized in directly securing or removably mounting a spare tire and wheel assembly in position on a vehicle.

The objects stated are merely illustrative. Other objects will become apparent from a study of the following specification and accompanying drawing in which:

Figure 1 is an end view in elevation and partial section looking into a trunk compartment at the rear of a vehicle; this view illustrates the spare tire mounting and utilization of the tire tool construction of my invention;

Figure 1A is a fragmental plan view showing a spring mounting of the construction of Figure 1;

Figure 2 is an enlarged side elevational view in partial section of the tire tool utilized;

Figure 2A is an enlarged front view of a section of the tire tool utilized on the same scale as Figure 2;

Figure 3 is an enlarged side view in elevation and partial section of the positioning member in position against the internal flange portion of the wheel;

Figure 3A is an enlarged top view of the positioning plate or member shown in Figure 3, and Figure 4 shows an enlarged side elevational view of the spring member utilized in securing the spare wheel assembly to the vehicle body.

In carrying out my invention I have provided the tire tool construction having an integral body provided with at least one lever handle and a hub. The hub is provided with a hole therein through which a holding pin projects. The holding pin has a hooked portion at one end thereof for hooking engagement with the hooked end portion of a spring member which has its opposite end secured to the vehicle body. A shaped mounting or positioning plate or member is adapted to fit in the internal flange of a wheel assembly and the hooked holding pin is adapted to project through a central opening in the positioning plate. The back face of the positioning plate or member is in fact a cam face so that rotation of the tire tool causes the lever handles to ride up on the risers of the back face of the positioning plate to tension the spiral spring and secure the wheel assembly in position on the vehicle. Means is provided to space the tool outwardly with respect to the spare assembly so that the tool may be freely employed by the user without obstruction from the spare assembly when securing the spare assembly in position on the vehicle. The tire tool of my invention may have a series of cross handle parts with various tool elements on the ends of the handles such as socket wrenches representing various sizes of hub mounting bolts and screw drivers which may be employed for prying and screwing as well as a jack handle.

With specific reference to Figure 1 of the drawings, I have for the purpose of illustrating my invention taken a section through a typical luggage compartment of an automobile. In this view, 10 represents a tire mounted on a metal wheel 11 that has a hub mounting flange 11a. The flange 11a has a series of slots or holes in spaced relationship thereabout to correspond to hub bolts of the vehicle. The tire 10 and metal wheel 11 constitute a tire and wheel assembly which may be employed as a spare in case of a puncture of the assembly being used on one of the hubs of the vehicle.

I have also shown an inner metal side wall 12 of the luggage compartment and a bottom wall 13 which has a depression or well 13a therein for receiving and positioning the spare tire and wheel assembly.

A mounting 14 having mounting strap or plate portions 14a and 14b as shown is secured by weld metal W to a lead portion 12a of the side wall 12. A connecting pivot pin 15 extends through cooperating looped ends of the plate portions 14a and 14b. The mounting plates 14a and 14b have central slots therein through which hooked end portion 16a of one end of a spiral mounting spring 16 extends to pivotally loop over the mounting pin 15 (see Figures 1 and 1A). The spring 16 may, as shown, be slightly bent to facilitate its use and the opposite end of the spring should have another hooked end portion 16b to aid in mounting the tire and wheel assembly. The spring member 16 is illustrated in Figure 4 with the hooks 16a and 16b in the same plane for the purpose of showing the hooks but the planes of the hooks are preferably rotated 90 degrees with respect to each other as shown in Figure 1.

An integral positioning element or plate 17 is utilized as part of the assembly for securing the spare wheel 10 in position. Figures 1, 3 and 3A show the positioning plate 17. The positioning element or plate 17 has a front abutting face 17a spaced by means of a spacing cylinder 17b from the rear face 17c. The abutting or positioning face 17a has a forwardly extending conical central portion adapted to act as a guide and fit into the central opening in the rim 11 of the wheel assembly and a flat face portion between the conical portion and the spacing cylinder 17b. The rear portion of the spacing cylinder 17b has a flanged portion 17'b to which the back face 17c is fixed by a suitable means such as by welding. The back face 17c is made up of a generally circular flat plate with riser portions 17d forced up thereon to form a cam face. The tops of the risers are preferably provided with locking lands or grooves 17e for positioning and holding handle parts 21, 22, 23 and 24 of a tire tool construction described in detail below. The height of the risers 17d is exaggerated somewhat in the drawing for purposes of illustration and description.

The tool construction of my invention is shown particularly in Figures 1, 2 and 2A. These figures illustrate that the tool construction has an integral body made up of a hub part 20 and a series of four cross-aligned handle parts 21, 22, 23 and 24. The handle parts project radially-outwardly from the hub part 20 and as shown may have various sizes of socket wrenches 21a and 23a or other tool elements at their outer extremities. Thus, the handle parts may function as wrenches for various sizes of nuts which are used with hub bolts for different vehicles, as a screw driver, and as a jack tool. The hub 20 of my tool is provided with a hole 20a through which a holding pin 25 projects. The holding pin 25 has a head 25a at one end and a hooked portion 25b at the opposite end which is adapted to engage the hooked portion 16b of the spiral spring 16 opposite the hooked end 16a which is fastened to the vehicle body.

In order to secure the tire and wheel assembly in position in the trunk of the vehicle, the tire and wheel assembly is placed in the trunk with the hooked end portion 16b of the spring member 16 extending into the central opening of the wheel flange portion 11a. The positioning member or plate 17 is then positioned so that the conical portion at abutting or positioning face 17a extends into the central opening of the wheel flange portion 11a and the flanged portion thereof abuts the internal flange portion 11a of the wheel assembly. The tire tool is placed against the back face 17c of the positioning member in such a manner that its arms 21, 22, 23 and 24 are in the low portions of the back face and the hooked portion 25b of the holding pin 25 in the hub 20 of the tire tool is hooked in the hooked end portion 16b of the spiral spring 16. The tire tool is then turned counter-clockwise a quarter of a turn so that its arms or handle parts ride up on the risers 17d of the back face 17c and rest in the positioning grooves 17e. When the tire tool rides up on the risers 17d the spiral spring is tensioned and the wheel assembly is held securely in position in the trunk of the automobile. The cylindrical space or portion 17b is provided for the positioning member 17 so that the tire tool will be spaced far enough away from the tire 10 that the tire will not interfere with turning the tool.

From the foregoing description it will be apparent that the objects of this invention have been accomplished by providing an improved tire tool construction and a simplified method of mounting a spare tire and wheel assembly in position which permits quick and easy mounting and removal of the assembly and one that will make a tire and jack tool conveniently and positively available for immediate use as needed.

What I claim is:

1. A device for removably securing spare wheels of the type which have an internal flange and a centrally located mounting hole therethrough to a vehicle comprising, a mounting pin secured to the vehicle body, a spiral spring member with hooked portions at each end thereof, one of the hooked ends of said spiral spring member being hooked to said mounting pin, a positioning plate having a front face portion to abut against the internal flange portion of the wheel, said positioning plate being provided with a centrally located opening to receive the opposite end of said spiral spring, the back face of said positioning plate being a cam face with risers thereon, an integral tool body having a hub part, at least one handle part projecting radially-outwardly from said hub part, a holding pin having one end rotatably mounted on said hub part and extending perpendicular to said handle part, said holding pin having a hook on its opposite end to engage the free hooked end portion of said spiral spring and position said integral tool body adjacent the back face of said positioning plate so that rotation of said integral tool body causes said handle part to ride up on said risers of said back face to tension said spiral spring and secure the wheel in position on the vehicle.

2. A mounting device of the character shown and described for removably securing a spare tire and wheel assembly which has an internal flange and a centrally located mounting hole therethrough in position on a spiral spring member that has one hooked end portion free and an opposite hooked end portion secured to a mounting pin on a vehicle body which mounting device comprises, a positioning plate provided with a centrally located opening, the front face portion of said positioning plate to abut against the internal flange portion of the wheel, the back face of said positioning plate being a cam face with risers thereon; an integral tool body having cross handle parts, a central hub part, and a holding pin having one end rotatably mounted on said hub part and extending perpendicular to the plane of said handle parts, said holding pin having a hook on its opposite end to extend into the opening in said positioning plate and releasably engage the free hook on the spiral spring member to position said integral tool body adjacent the back face of said positioning plate in such a manner that rotation of said integral tool body causes said handle parts to ride up on said risers, the back face of said positioning plate to tension the spiral spring and secure the wheel assembly in position on the vehicle.

3. A device for removably securing spare wheels of the type which have an internal flange and a centrally located mounting hole therethrough to a vehicle comprising, a spiral spring member with one end to be fixed to the vehicle body, a positioning plate having a front face portion to abut against the internal flange portion of the wheel, said positioning plate being provided with a centrally located opening to receive the free end of said spiral spring, risers on the back face of said positioning plate to make a cam face thereof, an integral tool body having a hub part, at least one handle part projecting radially-outwardly from said hub part, engaging means having one end mounted on said hub part and extending perpendicular to said handle part, said engaging means being provided to releasably engage the free end of said spiral spring and position said integral tool body adjacent the back face of said positioning plate so that rotation of said integral tool body causes said handle part to ride up on said risers of the back face to tension said spiral spring and secure the wheel in position on the vehicle.

4. A device for removably securing spare wheels of the type which have an internal flange and a centrally located mounting hole therethrough to a vehicle comprising, a spiral spring member with one end to be fixed to the vehicle body the free end of said spiral spring member being hooked, a positioning plate having a front face portion to abut against the internal flange portion of the wheel, said positioning plate being provided with a centrally located opening to receive the free end of said spiral spring, risers on the back face of said positioning plate to make a cam face thereof, an integral tool body having a hub part, at least one handle part projecting radially-outwardly from said hub part, a holding pin having one end rotatably mounted on said hub part and extending perpendicular to said handle part, said holding pin having a hook on its opposite end to engage the free hooked end portion of said spiral spring and position said integral tool body adjacent the back cam face of said positioning plate so that rotation of said integral tool body causes said handle part to ride up on said risers of said back face to tension said spiral spring and secure the wheel in position on the vehicle.

5. A mounting device of the character shown and described for removably securing a spare tire assembly which has an internal flange and a centrally located mounting hole therethrough in position on a spiral spring member that has one end secured to a vehicle body which mounting device comprises, a positioning plate provided with a centrally located opening, the front face portion of said positioning plate to abut against the internal flange portion of the wheel, the back face of said positioning plate being a cam face having risers thereon; an integral tool body having cross handle parts, a central hub part, and an engaging means on said hub part to releasably engage the free end of said spiral spring member to position said integral tool body adjacent the back face of said positioning plate in such a manner that rotation of said integral tool body causes said handle parts to ride up on said risers of the said back face of said positioning plate to tension the spiral spring and secure the wheel assembly in position on the vehicle.

References Cited in the file of this patent

UNITED STATES PATENTS

| | | |
|---|---|---|
| 2,057,200 | McCarthy | Oct. 13, 1936 |
| 2,674,394 | Hall et al. | Apr. 6, 1954 |

FOREIGN PATENTS

| | | |
|---|---|---|
| 503,628 | France | Mar. 21, 1920 |